US010607742B2

(12) United States Patent
Thibeault et al.

(10) Patent No.: US 10,607,742 B2
(45) Date of Patent: Mar. 31, 2020

(54) RADIATION SHIELDING MATERIALS CONTAINING HYDROGEN, BORON AND NITROGEN

(71) Applicants: National Institute of Aerospace Associates, Hampton, VA (US); U.S.A. as represented by the Administrator of the National Aeronautics and Space Administration, Washington, DC (US)

(72) Inventors: Sheila A. Thibeault, Hampton, VA (US); Catharine C. Fay, Yorktown, VA (US); Godfrey Sauti, Hampton, VA (US); Jin Ho Kang, Newport News, VA (US); Cheol Park, Yorktown, VA (US)

(73) Assignees: National Institute of Aerospace Associates, Hampton, VA (US); United States of America as represented by the Administrator of the National Aeronautics and Space Administration, Washington, DC (US)

( * ) Notice: Subject to any disclaimer, the term of this patent is extended or adjusted under 35 U.S.C. 154(b) by 531 days.

(21) Appl. No.: 13/694,325

(22) Filed: Nov. 19, 2012

(65) Prior Publication Data
US 2015/0248941 A1    Sep. 3, 2015

Related U.S. Application Data

(60) Provisional application No. 61/560,950, filed on Nov. 17, 2011.

(51) Int. Cl.
*G21F 1/00* (2006.01)
*G21F 1/10* (2006.01)
*G21F 1/06* (2006.01)
*B64G 1/54* (2006.01)

(52) U.S. Cl.
CPC .................. *G21F 1/00* (2013.01); *B64G 1/54* (2013.01); *G21F 1/06* (2013.01); *G21F 1/10* (2013.01); *G21F 1/103* (2013.01)

(58) Field of Classification Search
None
See application file for complete search history.

(56) References Cited

U.S. PATENT DOCUMENTS

| 3,261,800 A * | 7/1966 | Collins, III ................... 523/136 |
| 3,673,118 A | 6/1972 | Mandorf, Jr. |
| 5,707,471 A | 1/1998 | Petrak et al. |
| 6,478,994 B1 | 11/2002 | Sneddon et al. |
| 6,689,674 B2 | 2/2004 | Zhang et al. |
| 6,774,074 B2 | 8/2004 | Rousseau et al. |
| 6,805,390 B2 | 10/2004 | Nakayama et al. |
| 6,806,795 B2 | 10/2004 | Shin |
| 6,838,162 B1 | 1/2005 | Gruber et al. |
| 7,026,432 B2 | 4/2006 | Charati et al. |
| 7,041,620 B2 | 5/2006 | Smalley et al. |
| 7,229,747 B2 | 6/2007 | Park et al. |
| 8,206,674 B2 | 6/2012 | Smith et al. |
| 8,436,130 B2 | 5/2013 | Cote et al. |
| 8,703,023 B2 * | 4/2014 | Sainsbury ............. B82Y 30/00 252/500 |
| 9,845,269 B2 | 12/2017 | Kang et al. |
| 2003/0158323 A1 * | 8/2003 | Connell et al. ............... 524/495 |
| 2004/0004196 A1 * | 1/2004 | DeMeo et al. ............. 250/516.1 |
| 2005/0001205 A1 * | 1/2005 | Malalel ................... G21F 1/103 252/478 |
| 2005/0211930 A1 * | 9/2005 | DeMeo et al. ............. 250/516.1 |
| 2006/0008676 A1 | 1/2006 | Ebata et al. |
| 2006/0057050 A1 | 3/2006 | Ren et al. |

(Continued)

FOREIGN PATENT DOCUMENTS

| JP | 401288200 A | 11/1989 |
| JP | 2004-195718 A | 7/2004 |

(Continued)

OTHER PUBLICATIONS

Harrison et al. Polyethylene/Boron COmposites for Radiation Shielding Applications. Ceramic Engineering and Science Proceedings. 2009.*

(Continued)

*Primary Examiner* — Tanisha Diggs (57) ABSTRACT

The invention consists of radiation shielding materials for shielding in the most structurally robust combination against galactic cosmic radiation (GCR), neutrons, and solar energetic particles (SEP). Materials for vehicles, space structures, habitats, landers, rovers, and spacesuits must possess functional characteristics of radiation shielding, thermal protection, pressure resistance, and mechanical durability. The materials are tailored to offer the greatest shielding against GCR, neutrons, and SEP in the most structurally robust combination, also capable of shielding against micrometeoriod impact. The boron nitride nanotube (BNNT) is composed entirely of low Z atoms (boron and nitrogen). Some of the materials included in this invention are: boron nitride (BN) platelets, hot pressed BN, BNNT, BN particle containing resins, BN nanofiber containing resins, carbon fiber reinforced BN containing resins, BNNT containing resins, and hydrogenated BN and BNNT, hydrogen stored BN and BNNT, high hydrogen containing polymer or ceramic matrices, and a combination of these.

20 Claims, 3 Drawing Sheets

(56) References Cited

U.S. PATENT DOCUMENTS

| | | |
|---|---|---|
| 2006/0084752 A1 | 4/2006 | Ounaies et al. |
| 2006/0169996 A1 | 8/2006 | DEvelyn et al. |
| 2007/0102672 A1* | 5/2007 | Hamilton ............... 252/478 |
| 2007/0199729 A1 | 8/2007 | Siegel et al. |
| 2008/0197853 A1 | 8/2008 | Swift et al. |
| 2008/0275172 A1* | 11/2008 | Wise et al. ............. 524/424 |
| 2009/0117021 A1 | 5/2009 | Smith et al. |
| 2009/0221734 A1 | 9/2009 | Kuwahara et al. |
| 2009/0230353 A1 | 9/2009 | Shimazu et al. |
| 2010/0051879 A1 | 3/2010 | Sainsbury et al. |
| 2010/0102279 A1* | 4/2010 | Kim et al. ............... 252/478 |
| 2011/0068291 A1* | 3/2011 | Park et al. ............ 252/62.54 |
| 2011/0192016 A1* | 8/2011 | Kang et al. ............ 29/592.1 |
| 2012/0107594 A1 | 5/2012 | Kang et al. |
| 2012/0186742 A1* | 7/2012 | Kang et al. ............. 156/324 |
| 2013/0119316 A1* | 5/2013 | Sauti et al. ............. 252/478 |

FOREIGN PATENT DOCUMENTS

| | | | |
|---|---|---|---|
| JP | 2007-137720 A | 6/2007 | |
| JP | 2007-146039 A | 6/2007 | |
| JP | 2007-290929 A | 11/2007 | |
| JP | 2008-143743 A | 6/2008 | |
| JP | 2008-222964 | 9/2008 | |
| JP | 2008-538136 | 10/2008 | |
| JP | 2008-266101 | 11/2008 | |
| JP | 2009-161657 | 7/2009 | |
| JP | 2010-527320 | 8/2010 | |
| JP | 2012-523452 | 10/2012 | |
| JP | 2013-507324 | 3/2013 | |
| JP | 2013-535002 | 9/2013 | |
| WO | WO 2008/067137 A2 | 9/2008 | |
| WO | WO 2008/123326 | 10/2008 | |
| WO | WO 2011139384 A1 * | 11/2011 | .............. G21F 1/00 |

OTHER PUBLICATIONS

Li et al. Adsorption of hydrogen on novel Pt-doped BN nanotube: A density functional theory study. Journal of Molecular Structure: THEROCHEM 901 (2009) 103-109 (Year: 2009).*

Cheng, Z.Y. et al; "Effect of High Energy Electron Irradiation on the Electromechanical Properties of Poly(vinylidene Fluoride-Trifluorethylene) 50/50 and 65/35 Copolymers," IEEE Transactions on Ultrasonics, Ferroelectrics, and Frequency Control, vol. 47, No. 6.

Golberg, D. et al.; Nanotubes in Boron Nitride Laser Heated at High Pressure; Appl. Phy. Lett.; 69 (14), 2045-2047; 1996.

Golberg, D. et al.; "Boron Nitride Nanotubes," Advanced Materials, vol. 19, pp. 2413-2432, 2007 (20 pages).

Griebel et al. Molecular dynamics simulations of boron-nitride nanotubes embedded in amorphous Si—B—N. INS Preprint No. 0501, 2005.

Guillot, F.M. et al., "Electrostrictive Effect in Polyurethanes," Journal of Applied Polymer Science; vol. 9, pp. 399-404 (2003) (6 pages).

Huang, C. et al., "Poly(vinylide fluoride-trifluoroethylene) Based High Performance Electroactive Polymers," IEEE Transactions on Dielectrics and Electrical Insulation, vol. 11, No. 2; Apr. 2004 (13 pages).

Kang, Jin Ho et al., "All-Organic Actuator Fabricated with Single Wall Carbon Nanotube Electrodes," Journal of Polymer Science, Part B: Polymer Physics, vol. 46, pp. 2532-2538 (2008) (7 pages).

Katsuda, Y. Reinforcement of precursor-derived Si—(B—)C—N ceramics with carbon nanotubes. Dissertation, Stuttgart, 2005.

Lee et al.; Catalyst-Free Synthesis of Boron Nitride Single-Wall Nanotubes with a Preferred Zig-Zag Configuration; Physical Review B, vol. 64, 121405; 2001.

Michalski, P.J. et al., "Continuum Theory for Piezoelectricity in Nanotubes and Nanowires," Phys. Rev. Lett. 95, 116803, Jan. 11, 2005 (4 pages).

Nakhmanson, S.M. et al., "Spontaneous polarization and piezoelectricity in boron nitride nanotubes," The American Physical Society, Physical Review, vol. B 67, 235406 (2003) (5 pages).

Park, C. et al., "Actuating Single Wall Carbon Nanotube-Polymer Composites: Intrinsic Unimorphs," Advanced Materials, vol. 20, pp. 2074-2079 (2008) (6 pages).

Sai, N. et al. "Microscopic theory for nanotube piezoelectricity," Physical Review B 68, 241405(R) (2003) (3 pages).

Salehi-Khojin et al: "Buckling of boron nitride nanotube reinforced piezoelectric polymeric composites subject to combined electro-thermo-mechanical loadings", Composites Science and Technology, Elsevier, UK, vol. 68, No. 6, pp. 1489-1501, Oct. 30, 2007 (14 pages).

Simpson, J.O. et al., "Novel Piezoelectric Polyimides," Materials Research Society Symposium Proceedings, vol. 413 (1996) (6 pages).

Zhang, Q.M. et al., "An experimental investigation of electromechanical responses in a polyurethane elastomer," Journal of Applied Physics, vol. 81, 2770 (1997) (8 pages).

* cited by examiner

RADIATION SHIELDING MATERIALS CONTAINING HYDROGEN, BORON AND NITROGEN

CROSS REFERENCE TO RELATED APPLICATION

This patent application claims the benefit of and priority to U.S. Provisional Patent Application Ser. No. 61/560,950, filed on Nov. 17, 2011 for "Radiation Shielding Materials Containing Hydrogen, Boron and Nitrogen", the contents of which are hereby incorporated by reference in their entirety. This patent application is related to copending U.S. patent application Ser. No. 13/068,329, filed on May 9, 2011 for "Boron Nitride And Boron Nitride Nanotube Materials For Radiation Shielding", the contents of which are hereby incorporated by reference in their entirety.

STATEMENT REGARDING FEDERALLY SPONSORED RESEARCH OR DEVELOPMENT

The invention described herein was made in the performance of work under a NASA cooperative agreement and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the cooperative agreement partner elected to retain title.

BACKGROUND OF THE INVENTION

1. Field of the Invention

The present invention relates to radiation shielding material, and, more particularly to radiation shielding material fabricated with hydrogen, boron and nitrogen containing materials.

2. Description of Related Art

In space, the vehicle, crew, and scientific instruments are exposed to harsh environments including galactic cosmic radiation (GCR), neutrons, solar particle events (SPE), extreme temperature excursions, hard vacuum, neutrons and micrometeoroids. Materials for vehicles and spacesuits must possess functional characteristics of radiation shielding, thermal protection, pressure resistance, and mechanical durability. There is an existing need to develop new materials and composite layers that offer improved shielding against GCR, neutrons, and solar energetic particles (SEP) in the most structurally robust combination, also capable of shielding against micrometeoriod impact.

Radiation protection is an enabling technology for future exploration missions. Human missions greater than approximately 90 to 100 days beyond low Earth orbit (LEO) cannot be supported without developing shielding and/or biological countermeasures to remain below Permissible Exposure Limits. Adequate shielding measures are needed to enable safety of crew and hardware during long duration human missions up to 1 year in space. Hydrogen, boron, and nitrogen based materials can provide mechanically strong, thermally stable, structural materials with effective radiation shielding against GCR, neutrons, and SPE. Neutron exposure tests on boron nitride (BN) containing polymers and boron nitride nanotube (BNNT) containing polymers showed that they can provide great effectiveness for radiation shielding. However, the hydrogen content in the polymer matrix may not be sufficient to protect from GCR and SPE. By incorporating hydrogen into the BN and BNNT either by hydrogenation or hydrogen storage methods, highly effective radiation shielding materials can be realized against GCR, SPE, and neutrons. Lightweight durable multifunctional materials in all forms are needed for radiation protection for both humans and microelectronic components. Electronic components become more vulnerable to particulate radiation (including neutrons, protons, and heavy ions) as their size shrinks and the operating voltage is reduced. Microelectronics in future aerospace vehicles and medical applications, such as pacemakers, require effective lightweight radiation shielding materials such as transparent or nontransparent hydrogenated (or hydrogen stored) BNNT composite coatings or layers.

No other known experimental or computational studies have been done on the radiation shielding properties of hydrogenated or hydrogen stored BN and BNNT containing polymers. The prior art mostly uses high hydrogen containing material only, such as liquid hydrogen, water, or polyethylene. These materials alone, however, do not offer mechanical robustness or thermal protection for structural applications. Hydrogen content in water and polyethylene (known as highest hydrogen content polymer) may not be sufficient for long term space exploration for both humans and microelectronic components. The density of hydrogen is too low to be used for radiation shielding practically. In addition, hydrogen can slow down or scatter GCR, high energy neutrons, and SEP very effectively, but does not absorb neutrons very effectively compared with boron or nitrogen. Hydrogenated or hydrogen stored BN and BNNT materials can offer additional hydrogen content to the hydrogen containing polymer matrix against GCR and SPE while providing neutron shielding capability.

This innovation expands beyond the prior art and uses boron, nitrogen, hydrogen, hydrogenated or hydrogen stored BN and BNNT, and their combinations in the tailoring of radiation shielding materials for GCR, SPE, and neutrons. This invention uses modeling and experimental data to validate the model. There are a number of disadvantages to the prior art, in particular the inability to achieve very high effective cross sections of the shielding material. This necessitates the use of relatively large amounts of the filler material in order to be able to achieve effective shielding. The reliance on high hydrogen content brings with it problems including low material density (high liquid hydrogen volume required for effective shielding), lack of mechanical integrity, and flammability for some polymers. The use of micron size powders, as is currently described in the literature, leads to high filler volume fraction thresholds for effective radiation attenuation. This brings with it the problems of increased weight (the fillers are generally more dense than the matrix), increased cost, as larger amounts of neutron attenuating filler are required, very poor processibility as the filler volume increases and a drastic decrease in the other desirable properties of the resultant materials. Lead shields are extremely heavy because of lead's high density and they are not particularly effective at shielding against neutrons. Furthermore high energy electrons (including beta radiation) incident on lead may create bremsstrahlung radiation, which is potentially more dangerous to tissue than the original radiation. Lead is also extremely toxic to human health, leading to handling difficulties.

This invention also has applications for shielding radiation from nuclear propulsion systems, nuclear materials, nuclear reactors, nuclear accelerators, nuclear medicine, nuclear diagnostics, nuclear power plants, nuclear powered submarines, nuclear bombs, and dirty bombs.

It is a primary aim of the present invention to provide radiation shielding material fabricated with boron, nitrogen, hydrogen, hydrogenated or hydrogen stored BN and BNNT.

It is an object of the invention to enhance radiation shielding by the controlled addition and dispersion of hydrogenated or hydrogen stored BN and BNNT containing materials into a matrix (polymer or ceramic).

It is an object of the invention to achieve effective radiation shielding by homogeneously dispersing a hydrogenated or hydrogen stored BN and BNNT material (BN platelets, hot pressed BN, BNNT, BN particle containing high hydrogen polymer resins, BN nanofiber containing high hydrogen polymer resins, carbon fiber reinforced BN containing high hydrogen polymer resins, BNNT containing resins, and hydrogenated BNNT) into a matrix synthesized from a hydrogen containing polymer, a hydrogen containing monomer, or a combination thereof.

It is an object of the invention to achieve effective radiation shielding by homogeneously dispersing a hydrogenated or hydrogen stored BN and BNNT material (BN platelets, hot pressed BN, BNNT, BN particle containing high hydrogen polymer resins, BN nanofiber containing high hydrogen polymer resins, carbon fiber reinforced BN containing high hydrogen polymer resins, BNNT containing resins, and hydrogenated BNNT) into a matrix synthesized from a boron containing polymer, a boron containing monomer, or a combination thereof.

It is an object of the invention to achieve effective radiation shielding by homogeneously dispersing a hydrogenated or hydrogen stored BN and BNNT material (BN platelets, hot pressed BN, BNNT, BN particle containing high hydrogen polymer resins, BN nanofiber containing high hydrogen polymer resins, carbon fiber reinforced BN containing high hydrogen polymer resins, BNNT containing resins, and hydrogenated BNNT) into a matrix synthesized from a nitrogen containing polymer, a nitrogen containing monomer, or a combination thereof.

It is an object of the invention to provide a material for shielding against galactic cosmic radiation (GCR), solar particle events (SPE), and neutrons.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a method for manufacturing a material for providing shielding from radiation. The radiation shielding material is formed by first synthesizing a hydrogen containing boron nanomaterial/polymer material from a hydrogen containing boron nanomaterial and a matrix by controlled dispersion of the hydrogen containing boron nanomaterials into the matrix and then applying the synthesized material to an object to be protected from radiation selected from the group consisting of galactic cosmic radiation (GCR), solar particle events (SPE), and neutrons. The hydrogen containing boron nanomaterial is preferably one of BN platelets, hot pressed BN, BNNT, BN particle containing high hydrogen polymer resins, BN nanofiber containing high hydrogen polymer resins, carbon fiber reinforced BN containing high hydrogen polymer resins, BNNT containing resins, hydrogen stored BNNT or hydrogenated BNNT. The hydrogen containing boron nanomaterial is preferably homogeneously dispersed into the matrix and synthesized by in-situ polymerization under simultaneous mechanical shear and sonication. The hydrogen containing boron nanomaterial is preferably synthesized from BNNTs made up entirely of low Z (atomic number) boron and nitrogen atoms. The matrix may be a polymer matrix, a metallic matrix or a ceramic matrix. The matrix is preferably synthesized from a hydrogen containing polymer, a hydrogen containing monomer, or a combination or from a boron containing polymer, a boron containing monomer, or a combination. Alternatively, the matrix may be synthesized from a nitrogen containing polymer, a nitrogen containing monomer, or a combination. Most preferably, the matrix is synthesized from a diamine, 2,6-bis(3-aminophenoxy)benzonitrile ((1-CN)APB), and a dianhydride, pyromellitic dianhydride (PMDA) and the concentration of boron nitride in the matrix is between 5% and 80% by weight. The synthesized material may be in the form of a film, a thick casting, a fiber, a coating, a paste or a foam. If synthesis is into a fiber, the synthesized fiber may be incorporated into fabric or yarn. If synthesis is into a paste, the synthesized paste may be applied to the surface of an object or may form a layer within an object to provide protection from radiation.

BRIEF DESCRIPTION OF THE DRAWINGS

A more complete description of the subject matter of the present invention and the advantages thereof, can be achieved by reference to the following detailed description by which reference is made to the accompanying drawing in which.

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Lightweight durable multifunctional materials in all forms are needed for radiation protection for both humans and microelectronic components. Electronic components become more vulnerable to particulate radiation (including neutrons, protons, and heavy ions) as their size shrinks and the operating voltage is reduced. Microelectronics in future aerospace vehicles, electronics in satellites and medical applications, such as pacemakers, require effective lightweight radiation shielding materials such as transparent or nontransparent hydrogenated or hydrogen stored BNNT composite coatings or layers. Materials for Multi-Purpose Crew Vehicle (MPCV) and spacesuits should possess characteristics of radiation shielding, thermal protection, pressure resistance, reduced weight and mechanical durability to survive the space environments for an extended period of time, and these material systems show promise to provide these material attributes. The radiation shielding properties of hydrogenated or hydrogen stored BN and BNNT containing polymers have not been previously successfully utilized.

The objectives and expected significance of the invention are to develop a space radiation shielding material system that has high efficacy for shielding radiation and that also has high strength for load bearing primary structures. Such a material system has not previously existed. Hydrogen is effective at (1) fragmenting heavy ions such as are found in galactic cosmic radiation (GCR), (2) stopping protons such as are found in solar particle events (SPE), and (3) slowing down neutrons such as are formed as secondaries when the GCR and SPE interact with matter. Hydrogen, however, by itself is not a structural material. Polyethylene, with its empirical formula of $CH_2$, contains a lot of hydrogen and is a solid material, but it does not possess sufficient strength for load bearing aerospace structural applications. Hydrogen content in water and polyethylene (known as highest hydrogen content polymer) may not be sufficient for long term space exploration for both humans and microelectronic components. The density of hydrogen is too low to be used for radiation shielding practically. In addition, hydrogen can slow down or scatter GCR, high energy neutrons, and SEP very effectively, but does not absorb neutrons very effectively compared with boron or nitrogen. The industry currently selects aluminum alloys for primary structures, retrofitted with polyethylene or water ($H_2O$) for radiation shielding. Clearly, a newer paradigm or concept is needed. BNNTs can theoretically be processed into structural BNNTs and used for load bearing structures. Furthermore, the BNNTs are molecules; they can be incorporated into high hydrogen polymers and the resulting materials can be used as matrix resins for structural composites. The BNNTs are nanotubes; their molecular structure is attractive for hydrogenation and hydrogen storage. Boron has one of the largest neutron absorption cross sections of all the elements of the periodic table, and nitrogen has a larger neutron absorption cross section than carbon. The neutron absorption cross section for the isotope $B^{10}$ is 3835 barns, so enriching the BNNT or BN (boron nitride) with $B^{10}$ would produce even better protection against neutrons. Neutrons are produced as secondary radiation when the GCR and solar energetic particles (SEP) interact with the walls of the space structure (vehicle, lander, habitat) and also with the regolith on the surface of moons or planets. This neutron radiation has largely been ignored in previous space architectures and yet neutron radiation is known to be damaging to humans especially with regard to the formation of radiogenic cancers. Initially, various potential materials systems containing different forms, compositions, and layerings of hydrogen, boron, and nitrogen will be analyzed by using the NASA Langley Research Center developed OLTARIS (On-Line Tool for the Assessment of Radiation in Space) computer code. This tool will be used to predict the performance of the potential materials systems for shielding against GCR (galactic cosmic radiation) and SPE (solar particle events). Some of the materials utilized are: BN platelets, hot pressed BN, BNNT, BN particle containing resins, BN nanofiber containing resins, carbon fiber reinforced BN containing resins, BNNT containing resins, hydrogen stored BNNT and hydrogenated BNNT. The resins will be high hydrogen polymers. Candidate materials with optimized forms, compositions, and layers are fabricated based on modeling results. Unique features of this invention include combinations of boron, nitrogen and hydrogen in a structural material. The use of hydrogenated or hydrogen stored BNNT is novel. Preferable for use in this invention are hydrogen containing BNNT, hydrogen storage in BNNT, hydrogen storage of BNNT, hydrogenated BNNT, and hydrogenation of BNNT. BNNT's molecular structure is attractive for hydrogenation and hydrogen storage. There are two techniques for introducing hydrogen into BNNT: (1) hydrogen storage, and (2) hydrogenation of the BNNT (hydrogenated BNNT). In the hydrogen storage method, nanotubes are favored for hydrogen storage over particles and sheets because they have much larger surface areas and higher hydrogen binding energy. The hydrogen storage method for introducing hydrogen into BNNTs, as a function of temperature, pressure, and hydrogen gas concentration, may be performed with a hydrogen storage chamber equipped with a hydrogen generator. The second method of introducing hydrogen into BNNTs is hydrogenation of BNNTs where hydrogen is covalently bonded onto boron, nitrogen or both. A combination of the two approaches may provide yet higher hydrogen content. The first approach is the hydrogen storage route. Nanotubes are favored for storing hydrogen over particles and sheets because they have much larger surface areas and higher hydrogen binding energy. Theoretical ab initio calculations showed that BNNTs are a preferable medium for hydrogen storage compared with CNTs because of their heteropolar binding nature of their atoms (Mpourmpakis, G.; and Froudakis, G. E.: Why boron nitride nanotubes are preferable to carbon nanotubes for hydrogen storage? An ab initio theoretical study, Catalyst Today 120, 341 (2007), incorporated herein by reference in its entirety). The ionic character of the BNNT's bonds offers 40% higher binding energy of hydrogen than CNTs. The point charges on the tube's wall induce a dipole on the hydrogen molecule resulting in more efficient binding (Froudakis, G. E.: Hydrogen storage in nanotubes & nanostructures, Materials Today 14, 324 (2011), incorporated herein by reference in its entirety). The binding energy in BNNTs is even greater than that in planar BN sheets by about 10%, which is presumably due to the buckling (curvature with $sp^3$ nature) of BN bonds. The diffusion of hydrogen is therefore slower in small diameter BN nanotubes than in larger diameter ones (Jhi, S.-H.; and Kwon, Y.-K.: Hydrogen adsorption on boron nitride nanotubes: A path to room-temperature hydrogen storage, Phys. Rev. B 69, 245407 (2004), incorporated herein by reference in its entirety). Therefore, the hydrogen desorption temperature of BNNT is expected to be much higher as well, which is beneficial for use in high temperature environments. Experimentally, multiwall bamboo-like BNNT showed up to 2.6 wt % hydrogen storage (Ma, R.; Bando, Y.; Zhu, H.; Sato, T.; Xu, C.; and Wu, D.: Hydrogen uptake in boron nitride nanotubes at room temperature, J. Am. Chem. Soc. 124, 7672 (2002), incorporated herein by reference in its entirety) and collapsed structure BNNTs could store up to 4.2 wt % hydrogen (Tang, C.; Bando, Y.; Ding, X.; Qi, S.; and Golbeg, D.: Catalyzed collapse and enhanced hydrogen storage of BN nanotubes, J. Am. Chem. Soc. 124, 14550 (2002), incorporated herein by reference in its entirety) even at room temperature, which is significantly higher than CNTs. The majority (95%) of the adsorbed hydrogen was safely stored up to 300 to 450° C.

Long thin, highly crystalline BNNTs may store much higher hydrogen than BNNTs having other structures because they can provide much higher specific surface area with thinner and longer tubes. They can provide also smaller pores among the bundles, which allows more effective absorption of hydrogen with higher heat of adsorption (Panella, B.; Hönes, K.; Müller, U.; Trukhan, N.; Schubert, M.; Hitter, H.; and Hirscher, M.: Desorption studies of hydrogen in metal-organic frameworks, Angew. Chem. Int. Ed. 47, 2138 (2008), incorporated herein by reference in its entirety).

Defects on the BNNT wall can improve the hydrogen storage. The vacancies reconstruct by forming B—B and N—N bonds across the defect site, and the defects offer smaller charge densities that allow hydrogen molecules to pass through the BNNT wall for storing hydrogen molecules inside the BNNT (Özdogan, K.; and Berber, S.: Optimizing the hydrogen storage in boron nitride nanotubes by defect engineering, Int. J. Hydrogen Energy 34, 5213 (2009), incorporated herein by reference in its entirety). In addition, metal (Rh, Ni, Pd, or Pt) doped BNNTs can store more hydrogen molecules because hydrogen interacts highly with metal atoms due to the hybridization of the metal d orbital with the hydrogen s orbital (Li, X. M.; Wei, W. Q.; Huang, X.-R.; Sun, C.-C.; and Jiang, L.: Adsorption of hydrogen on novel Pt-doped BN nanotube: A density functional theory study, J. Mol. Struct. 901, 103 (2009), incorporated herein by reference in its entirety). Thin, long BNNTs possess well-defined inner tube storage to take up hydrogen more effectively compared with bamboo or herringbone type BNNTs. Nitric acid treatment or controlled thermal exposure (e.g. 800° C. in air for 20 min) can open the tips of the tubes and some parts of the tube surfaces and create minor defects to expedite hydrogen uptake inside of the tubes.

The study of hydrogen storage of BNNTs, as a function of temperature, pressure, and hydrogen gas composition, may be performed with a hydrogen storage chamber equipped with a hydrogen generator. A quartz hydrogen chamber (Carbolite, Ltd.) and a pressure chamber (5100 Reactor, Parr Instrument Company) may be used. In a second study of hydrogen storage in BNNTs, catalytic nanoparticles (NPs) are added to BNNTs by using an environmentally friendly supercritical fluid (SCF) $CO_2$ chamber to facilitate the dissociation of hydrogen molecules to hydrogen atoms that will then move from the catalytic NP sites to the surfaces of BNNTs to be absorbed. Supercritical $CO_2$ possesses excellent solubility of a number of metal salts, a gas-like diffusivity, and an extremely low viscosity, which offers excellent mass-transfer properties. A platinum salt ((1,5-Cyclooctadiene)dimethyl platinum (II)) has been metallized onto nanotube surfaces in a SCF infusion system. BNNTs are incorporated with catalytic platinum NPs using the same SCF system under high pressure and elevated temperature. The decorated BNNTs will uptake dissociated hydrogen atoms efficiently in the pressurized SCF chamber at an elevated temperature to build a structural material that shields radiation. The uptake hydrogen content may be analyzed with a modified surface analyzer (Nova 2200e, Quantachrome) and TGA-Mass spectroscope (STA 409, Netzsch).

The second approach to producing hydrogen containing BNNT materials is the hydrogenation of BNNTs in which hydrogen is covalently bonded onto boron or nitrogen or both. Although high hydrogen containing BNNTs can be achieved, this approach may sacrifice the other attractive structural and thermal characteristics of BNNTs by disrupting π (or pi) conjugated $sp^2$ BN bonding. An optimum degree of hydrogenation should, therefore, be determined depending on the missions to utilize the hydrogen containing BNNT materials.

A hydrogen plasma quartz chamber and a low pressure hydrogenation chamber with a catalyst may be employed for hydrogenation. Raman, FTIR, and TGA-Mass spectroscopy may be used to assess the degree of hydrogenation.

Combining both hydrogen storage and hydrogenation approaches may provide synergistically improved radiation shielding effectiveness because modified $sp^2$ bonds on BNNTs can afford more hydrogen storage.

Following production of thermally stable high hydrogen containing BNNTs, they are incorporated into high hydrogen high performance polymers. The resulting polymeric materials or nanocomposites may be characterized for a number of relevant mechanical, dynamic mechanical, and thermal properties for space structural applications.

The advantages of the proposed invention as a space radiation shielding material system are that it has high efficacy for shielding radiation and that it also has high strength for load bearing primary structures. We know that hydrogen is effective at (1) fragmenting heavy ions such as are found in galactic cosmic radiation (GCR), (2) stopping protons such as are found in solar particle events (SPE), and (3) slowing down neutrons such as are formed as secondaries when the GCR and SEP interact with matter. Hydrogen, however, by itself is not a structural material. Polyethylene, with its empirical formula of $CH_2$, contains a lot of hydrogen and is a solid material, but it does not possess sufficient strength for load bearing aerospace structural applications. Hydrogen content in water and polyethylene (known as highest hydrogen content polymer) may not be sufficient for long term space exploration for both humans and microelectronic components. The density of hydrogen is too low to be used for radiation shielding practically. In addition, hydrogen can slow down or scatter GCR, high energy neutrons, and SEP very effectively, but does not absorb neutrons very effectively compared with boron or nitrogen. The industry uses aluminum alloys for primary structures, retrofitted with polyethylene or water ($H_2O$) for radiation shielding. The BNNTs are made up entirely of low Z (atomic number) atoms—boron and nitrogen. Boron (Z=5) and nitrogen (Z=7) are larger than hydrogen (Z=1), but they are still small and they are smaller than aluminum (Z=13). The BNNTs can theoretically be processed into structural BNNTs and used for load bearing structures. Furthermore, the BNNTs are molecules; they can be incorporated into high hydrogen polymers and the resulting materials used as matrix resins for structural composites. The BNNTs are nanotubes; their molecular structure is attractive for hydrogenation and hydrogen storage. Boron has one of the largest neutron absorption cross sections of all the elements of the periodic table, and nitrogen has a larger neutron absorption cross section than carbon. The neutron absorption cross section for the isotope $B^{10}$ is 3835 barns, so enriching the BNNTs or BN (boron nitride) with $B^{10}$ would produce even better protection against neutrons. Therefore, hydrogen containing BN or BNNT materials would be the most effective radiation shielding materials for GCR, SPE, and neutrons.

Figure 1:
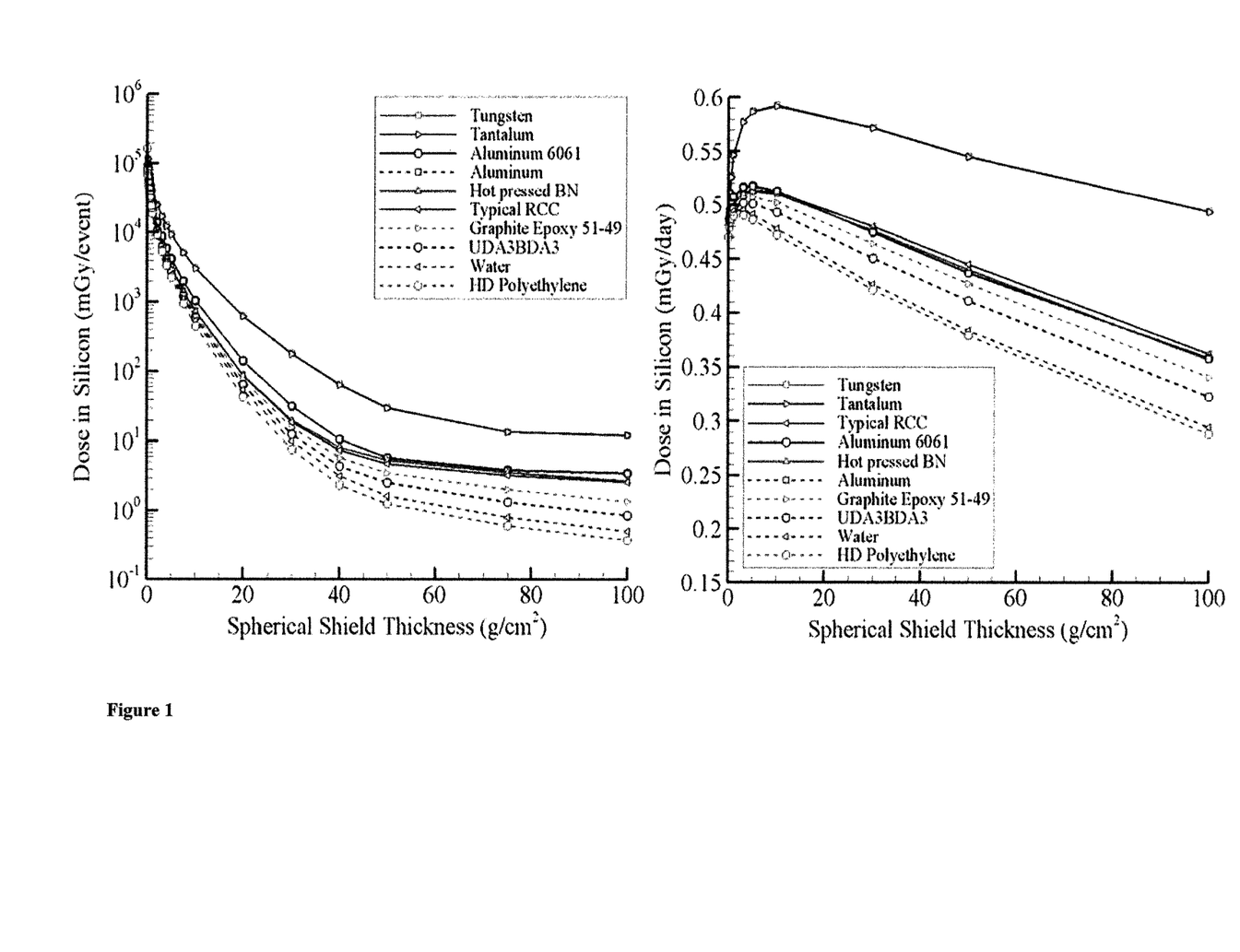
FIG. 1 shows a graph of dose in silicon versus shielding thickness for the 1972 King SPE (left pane) and 1977 solar minimum GCR environment (right pane)

On-LineTool for the Assessment of Radiation in Space (OLTARIS) is a web-based set of models that allows scientists and engineers to study the effects of space radiation on humans and electronics. OLTARIS provides an integrated tool based on current best practices, databases, and state-of-the-art methodologies to evaluate and optimize human systems such as spacecraft, spacesuits, rovers, and habitats. The OLTARIS architecture is divided into two main parts, the website, on which users interact through a browser, and the execution environment, where the computations are performed. For example, lower energy trapped electron environments near-Earth are more efficiently shielded by heavier materials. The data in FIG. 1 also shows that there is little difference, from a radiation exposure perspective, between pure aluminum and the aluminum 6061 alloy. This type of information is useful when trading radiation protection properties against other properties important for mission objectives (conductive, thermal, structural, etc.). It should be noted that the execution time for the results shown in FIG. 1 is on the order of seconds to minutes, thereby allowing many materials to be rapidly analyzed in a variety of environments. Representative results are shown in FIG. 1 for the 1972 King event (left pane) and the 1977 solar minimum GCR environment (right pane). The King parameterization of the 1972 event is being used due to its historical presence in the literature and use as a design standard environment. The 1977 solar minimum GCR environment is being used also because of its historical presence in the literature and because it represents a severe case for the natural background environment in space. The materials have been ordered in the legend according to the dose level found at 100 g/cm$^2$. Note that the vertical axis for the SPE results is in log scale, while the vertical axis for the GCR results is linear. The rapid decline of the SPE dose versus depth curve reflects large energy deposition by the lower energy primary protons as they pass through the slab. Conversely, the slower decline of the GCR dose versus depth curve reflects smaller energy losses by more energetic protons and heavier ions. This indicates that shielding is more effective in reducing exposure levels for SPE than GCR. FIG. 1 shows that hydrogen rich materials such as water and polyethylene provide the best radiation shielding at all thicknesses. This is primarily due to the low charge and neutron number in the target (fewer target fragments) and the ability of hydrogen to attenuate low energy neutrons through elastic collisions. Heavier materials such as tungsten and tantalum are less efficient radiation shields due to the large number of target fragments and neutrons that may be produced. It should be noted that these results are not true for all space radiation environments.

Figure 2:
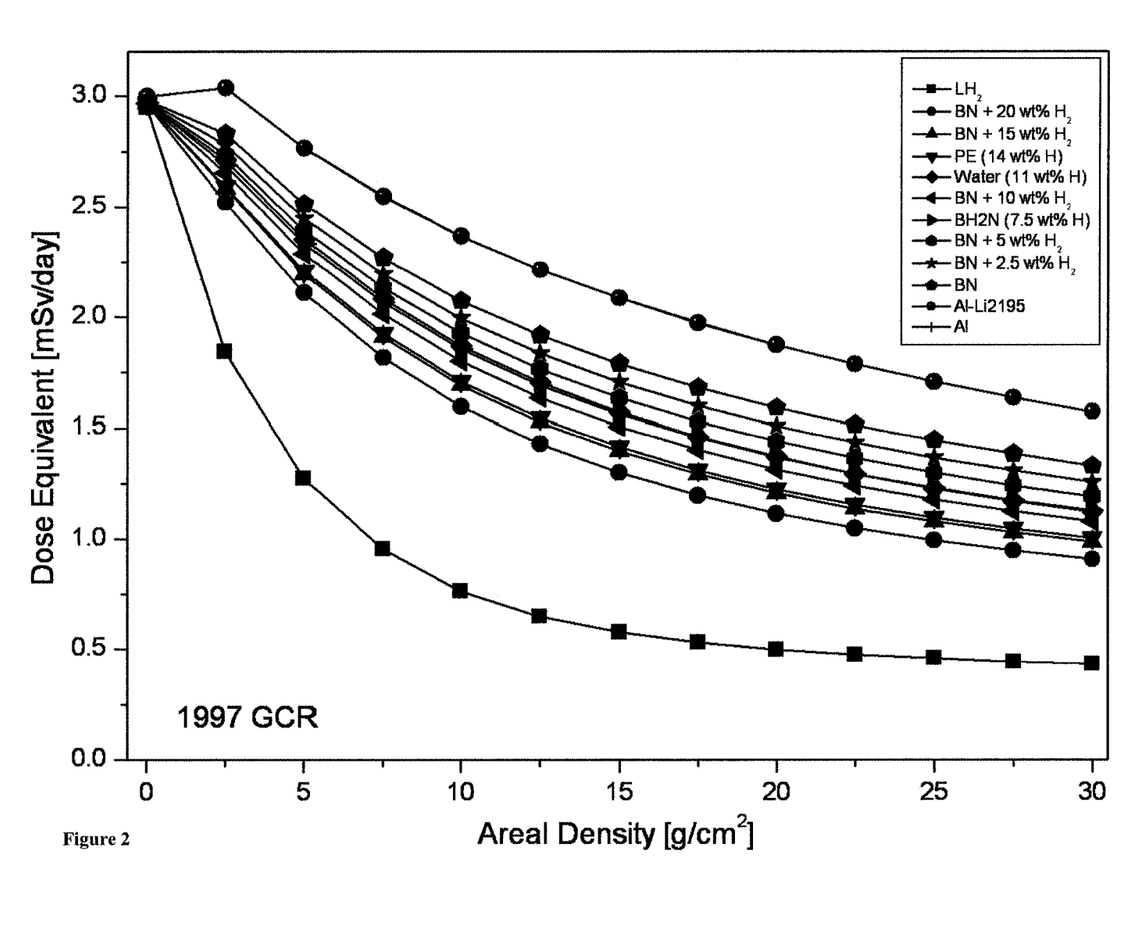
FIG. 2 shows a graph of galactic cosmic radiation (GCR) dose equivalent for BN+H materials.
Figure 3:
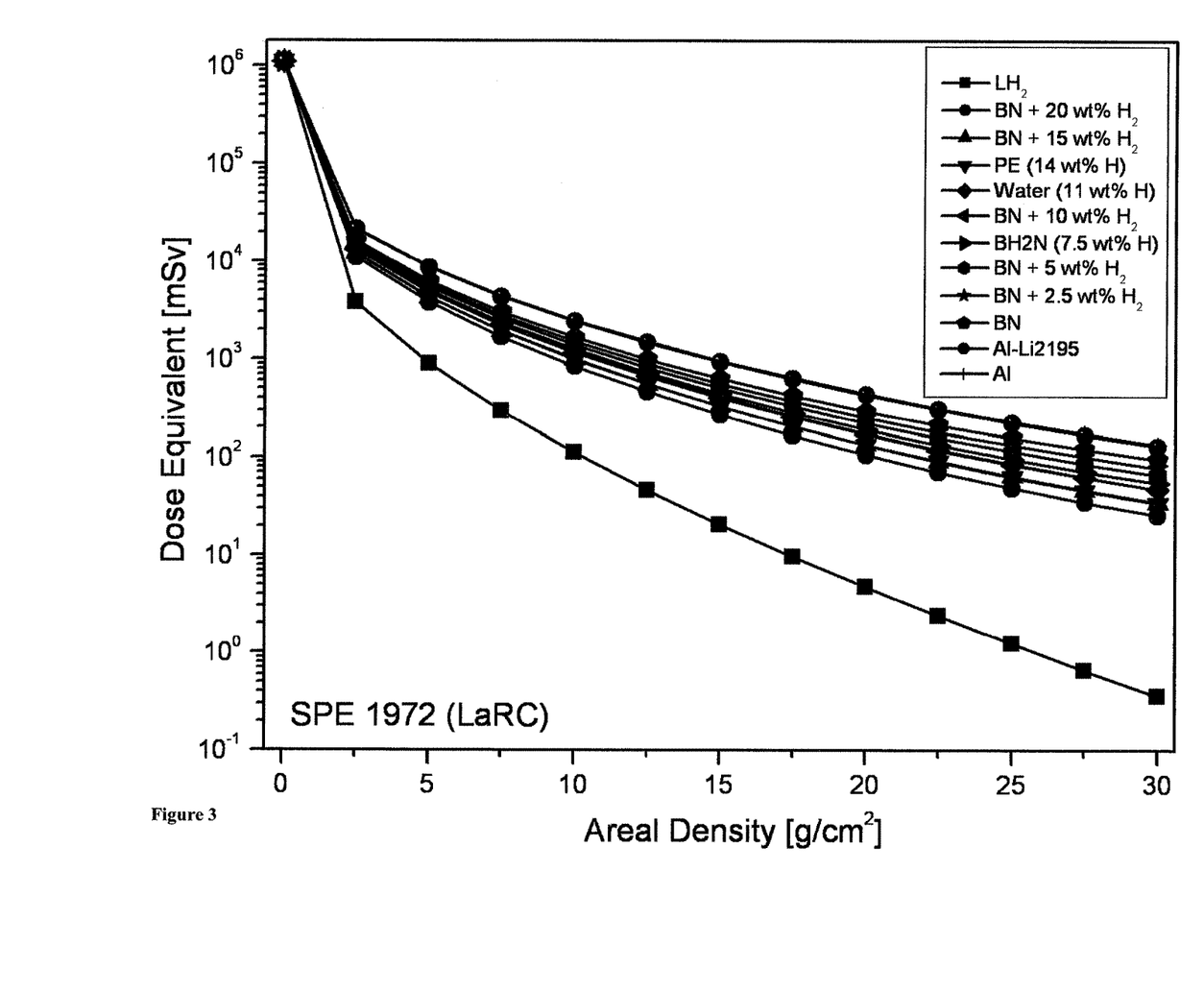
FIG. 3 shows a graph of solar particle event (SPE) dose equivalent for BN+H materials.

FIGS. 2 and 3 show calculated results for GCR dose equivalent and SPE dose equivalent, respectively, for BN plus varying weight percents of hydrogen, as functions of a real density (g/cm$^2$). In both of these figures, liquid hydrogen LH$_2$ is the best shield, but one cannot build structures out of liquid hydrogen. The next best shield in both figures is the BN+20% hydrogen. This is a solid material, and it can be used for structures.

Because effective radiation shielding is achieved while maintaining optical transparency, the present invention is also used in the form of thin layers for helmet visors for pilots and astronauts, or aircraft/space vehicle windows for cockpits and passenger cabins. Hydrogen, boron, nitrogen containing woven fiber mats, large films or 'paints' are used to form a lightweight covering to line entire cabin sections. The disclosed method, when formed into a paint-like paste or foam, is applied to the outer surface of an object to improve radiation protection. Hydrogen, boron, nitrogen containing materials are used to produce 'radiation-hardened' packaging for electronics components, with such packaging some distance from the chip substrate to prevent secondary particles from interfering with the circuitry. Using hydrogenated or hydrogen stored BNs or BNNTs, which have a low electrical conductivity and a high thermal conductivity, is an additional advantage in this application as they enhance the packaging's capability to conduct heat out, while maintaining the electronics electrically isolated. Hydrogen, boron, nitrogen containing materials are also used as transparent windows of vessels for containing reactions generating neutrons of appropriate energies. Hydrogen, boron, nitrogen containing materials, fabrics, and garments are used to protect crew and equipment from neutrons from medical devices and the reactors in nuclear powered submarines and nuclear-powered spacecraft. They can be served as clothing or clothing liners/undergarments (e.g. for astronaut and pilot suits), aprons, blankets, sleeping bags, lab coats or liners thereof, for workers in high radiation environments including space vehicles, nuclear submariners, and medical radiologists. Hydrogen, boron, nitrogen containing materials formed according to the present invention are used to protect instruments in craft powered by a radioisotope thermoelectric generator (RTGs). $^{242}$Cm and $^{241}$Am, which are a potential fuel for RTGs, also require heavy shielding as they generate high neutron fluxes. Hydrogen, boron, nitrogen containing materials act to shield against positively charged particles of all energies—including protons, alpha particles, light ions, intermediate ions, heavy ions, galactic cosmic radiation particles, and solar energetic particles.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

What is claimed is:

1. A method for manufacturing a material for providing shielding from particle radiation with mass, comprising:
   producing a hydrogen stored boron nitride nanotube (BNNT) by at least one of performing a nitric acid treatment to create minor defects for expedited hydrogen intake of the hydrogen stored BNNT or adding catalytic nanoparticles in a supercritical fluid CO$_2$ chamber;
   synthesizing a hydrogen containing boron nanomaterial/polymer material from the hydrogen stored boron nitride nanotube (BNNT) and a matrix by controlled dispersion of the hydrogen stored BNNT into the matrix; and
   applying the synthesized hydrogen containing boron nanomaterial/polymer material to an object to be protected from particle radiation with mass, the particle radiation including one or more of galactic cosmic radiation (GCR), solar particle events (SPE), or neutrons.

2. The method of claim 1, wherein the hydrogen stored BNNT is homogeneously dispersed into the matrix.

3. The method of claim 1, wherein the hydrogen containing boron nanomaterial/polymer material is synthesized by in-situ polymerization under simultaneous mechanical shear and sonication.

4. The method of claim 1, wherein the hydrogen stored BNNT is made up entirely of low (atomic number) hydrogen, boron and nitrogen atoms.

5. The method of claim 1, wherein the matrix is synthesized from a substance selected from the group consisting of a hydrogenated boron containing polymer, a hydrogen containing boron containing polymer, a hydrogenated boron containing monomer, a hydrogen containing boron containing monomer, and a combination thereof.

6. The method of claim 1, wherein a concentration of boron nitride in the synthesized hydrogen containing boron nanomaterial/polymer material is between 5% and 80% by weight.

7. The method of claim 1, wherein the synthesized material is in a form selected from the group consisting of a film, a thick casting, a fiber, a paste, a coating and a foam.

8. The method of claim 7, wherein the synthesized fiber is incorporated into fabric or yarn.

9. The method of claim 7, wherein the synthesized paste is applied to the surface of the object to provide protection from radiation.

10. The method of claim 7, wherein the synthesized paste forms a layer within the object to provide protection from radiation.

11. The method of claim 1, wherein the matrix is a combination of a polymer, a ceramic and a metallic material.

12. The method of claim 1, wherein the catalytic nanoparticles are catalytic platinum nanoparticles.

13. The method of claim 1, wherein the hydrogen stored BNNT is metalized with metal salts in a supercritical fluid infusion system.

14. The method of claim 13, wherein the metal salts include a platinum salt (1,5-Cyclooctadiene)dimethyl platinum (II)).

15. The method of claim 1, wherein the matrix is synthesized from a diamine, 2,6-bis(3-aminophenoxy)benzonitrile ((1-CN)APB), and a dianhydride, pyromellitic dianhydride (PMDA).

16. A method for manufacturing a material for providing shielding from particle radiation with mass, comprising:

synthesizing a hydrogen stored boron nitride nanotube (BNNT) by adding catalytic platinum nanoparticles in a supercritical fluid $CO_2$ chamber; and applying the synthesized hydrogen stored BNNT to an object to be protected from particle radiation with mass, the particle radiation including one or more of galactic cosmic radiation (GCR), solar particle events (SPE), or neutrons.

17. The method of claim 16, wherein the hydrogen stored BNNT is produced with a nitric acid treatment to create minor defects for expedited hydrogen intake of the hydrogen stored BNNT.

18. The method of claim 16, wherein the hydrogen stored BNNT is produced by adding catalytic nanoparticles in a supercritical fluid $CO_2$ chamber.

19. The method of claim 16, wherein:

the hydrogen stored BNNT is metalized with metal salts in a supercritical fluid infusion system; and the metal salts include a platinum salt (1,5-Cyclooctadiene)dimethyl platinum (II)).

20. A method for manufacturing a material for providing shielding from particle radiation with mass, comprising:

producing a hydrogen stored boron nitride nanotube (BNNT) in a hydrogen storage chamber equipped with a hydrogen generator;

producing a hydrogenated BNNT in a hydrogen plasma quartz chamber and a low pressure hydrogenation chamber to covalently bond hydrogen onto boron and nitrogen of boron nitride nanotubes;

synthesizing a matrix from a diamine, 2,6-bis(3-aminophenoxy)benzonitrile ((1-CN)APB), and a dianhydride, pyromellitic dianhydride (PMDA);

synthesizing a hydrogen containing boron nanomaterial/polymer material from the hydrogen stored BNNT, the hydrogenated BNNT, and the matrix, wherein the hydrogen containing boron nanomaterial/polymer material has a concentration of boron nitride of between 5% and 80% by weight; and applying the synthesized hydrogen containing boron nanomaterial/polymer material to an object to be protected from particle radiation with mass, the particle radiation including one or more of galactic cosmic radiation (GCR), solar particle events (SPE), or neutrons.

* * * * *